United States Patent [19]
O'Connor

[11] Patent Number: 5,973,264
[45] Date of Patent: Oct. 26, 1999

[54] MODULAR ELECTRICAL SERVICE RISER WITH RETRACTABLE CONDUIT

[75] Inventor: John M. O'Connor, Orland Park, Ill.

[73] Assignee: North American Technologies Co., Inc., Burr Ridge, Ill.

[21] Appl. No.: 08/693,764

[22] Filed: Aug. 7, 1996

[51] Int. Cl.⁶ .................................................. H01B 7/06
[52] U.S. Cl. .............................. 174/69; 174/37; 174/38; 361/659; 361/668
[58] Field of Search .................................. 174/1, 37, 38, 174/45 R, 69, 52.1; 280/422; 307/147, 9.1; 361/826, 827, 659, 668, 601

[56] References Cited

U.S. PATENT DOCUMENTS

| | | | |
|---|---|---|---|
| 3,026,409 | 3/1962 | Deisch | 174/69 |
| 3,158,679 | 11/1964 | Ware | 174/1 |
| 3,361,938 | 1/1968 | Watson | 361/659 |
| 3,494,657 | 2/1970 | Tantlinger et al. | 296/208 |
| 3,691,288 | 9/1972 | Sturdivan | 174/38 |
| 3,792,189 | 2/1974 | Stengel et al. | 174/69 |
| 4,307,436 | 12/1981 | Eckart et al. | 174/38 |

*Primary Examiner*—Dean A. Reichard
*Assistant Examiner*—Kamand Cuneo
*Attorney, Agent, or Firm*—Jenner & Block

[57] ABSTRACT

A modular electrical service riser includes an elongated conduit that is extended into a raised operating position and retracted into a transport position. The elongated conduit is substantially linear so as to avoid bending the cables in the conduit. The riser includes a novel meter fitting/disconnect that allows the riser to be used with overhead or underground utility company power lines or an overhead or underground customer subfeed. When the riser is used with a utility company power line, the meter is used. When the riser is used with a customer subfeed, the meter is bypassed. The riser can be moved from site to site without incurring extensive hardware and labor costs at each site because it can be used with four different types of power sources.

22 Claims, 3 Drawing Sheets

MODULAR ELECTRICAL SERVICE RISER WITH RETRACTABLE CONDUIT

BACKGROUND OF THE INVENTION

1. Field of the Invention

The present invention relates to a modular electrical service riser meter center and disconnect, and more particularly, to a modular electrical service riser that includes an elongated conduit that may be extended and retracted and is substantially linear when the conduit is extended into its raised operating position.

2. Description of the Related Art

Electrical service often needs to be provided on a temporary basis for, e.g., trailers used as temporary classrooms or used in the construction industry. Traditionally, initiation of temporary electrical service for such trailers required the services of a local electrical contractor at the individual site to install a meter fitting and a disconnect along with a service riser, for connection to an overhead power line or subfeed, or an entrance for connection to an underground power line or subfeed. When the trailer was moved to a new location, the hardware that was used in providing the temporary electrical service was discarded and new hardware installed at the new trailer location. This required a new electrical contractor to once again install a meter fitting and a disconnect and a service riser or entrance. Thus, each new location of the trailer required a duplication of the subcontracting, material and labor costs. These costs could be several thousand dollars at each trailer location.

One attempt to provide a system to solve these problems is disclosed in U.S. Pat. No. 3,158,679 to Ware. Ware discloses a tower attached to a portable trailer. When the trailer reaches the location at which electrical service is desired, the tower is raised up and a connection made to an overhead power line. When the trailer is to be moved to a new location, the tower is folded down on top of the trailer. As shown in FIG. 4 of Ware, when folded down, Ware's tower sits on top of, and extends beyond the end of, the trailer. This can lead to problems in transport, especially when the trailer is as big as the road will allow.

The tower that houses the cables of Ware's system includes two bends that each change the direction of the cables by 90°. These sharp bends place significant stress on the cables and can damage the cables. In addition, such bends violate current standard bending radius rules requirements for service cables. Furthermore, Ware's system only envisions connection to an overhead power line and provides no means for connection to an overhead subfeed or to an underground power line or subfeed. As such, Ware's system cannot be used for many applications.

In addition, existing meters and disconnects are designed for use with either utility company power lines or a customer's subfeed, but not both. Therefore, the same equipment may not be able to be used when a trailer is moved from one location to another.

Thus, it would be desirable to provide a modular electrical service riser that can be transported from one location to another and reused, without requiring the duplication of the subcontracting, material and labor costs. The system should allow for connection to either an overhead or underground power line or subfeed. The system should not require sharp bending of the cables within the conduit that houses the cables.

SUMMARY OF THE INVENTION

A modular electrical service riser in accordance with the present invention accomplishes each of these goals. The riser is attached to a structure and provides a connection to a power source. The riser includes a plurality of conductive cables housed in an elongated conduit. A service head is located at one end of the elongated conduit for connecting the cables to the power source. A meter fitting/disconnect is provided for receiving the cables. The elongated conduit is movable between an operating position (in which it is substantially linear) and a transport position. In one embodiment, the meter fitting/disconnect includes a first means for using the riser with an overhead power line and a second means for using the riser with an underground subfeed. The meter fitting/disconnect can further include a third means for using the riser with an overhead subfeed and a fourth means for using the riser with an underground power line. The cables can include an upper portion and a lower portion. The service head can include a lug box for electrically connecting the upper portion of each cable to the lower portion of each cable.

In another embodiment, a modular electrical service riser can include a plurality of conductive cables and an elongated conduit for housing part of the length of the cables. A service head is provided at one end of the elongated conduit for connecting the cables to the power source. A housing defining a cable reservoir is provided. The cable reservoir houses a portion of the cables. The housing also defines an opening for telescopically receiving the elongated conduit. A meter fitting/disconnect is located adjacent the housing for receiving the cables. The elongated conduit is movable between a raised operating position and a retracted transport position.

The elongated conduit can be substantially linear in both the raised operating position and the retracted transport position. The meter fitting/disconnect can include a first means for using the riser with an overhead power line and a second means for using the riser with an underground subfeed. The meter fitting/disconnect can further include a third means for using the riser with an overhead subfeed and a fourth means for using the riser with an underground power line. The riser can further include means for preventing movement of the elongated conduit into the cable reservoir. The preventing means can include an expansion fitting disposed about the elongated conduit wherein the conduit and the expansion fitting are larger in at least one dimension than the opening in the housing. The cables can include an upper portion and a lower portion. The service head can include a lug box for electrically connecting the upper portion of each cable to the lower portion of each cable.

A modular electrical service riser in accordance with another embodiment of the present invention includes a first plurality of cables for connecting to the power source and a second plurality of cables spaced apart from the first plurality of cables. The riser includes means for electrically connecting the first plurality of cables to the second plurality of cables. A meter fitting/disconnect receives the second plurality of cables. The connecting means is movable between an operating position and a transport position and is substantially linear in the operating position. The connecting means can include an elongated conduit or a bus way. The riser can include a housing defining a cable reservoir for housing at least a portion of the second plurality of cables. The housing also can define an opening for telescopically receiving the connecting means.

An apparatus for supporting an object for use with the present invention can include a base, a strap having a central curved portion and two flat end portions disposed on opposite sides of the central curved portion, a means for attaching the strap to the base and a hand-operated twist knob for releasably tightening the strap about the supported object. The apparatus can include a saddle disposed between the central curved portion and the supported object. The hand-operated twist knob can be disposed on the central curved portion or one of the flat end portions. If the twist knob is disposed on one of the end portions, the curved portion is shorter on the side adjacent that end portion. In addition, that end portion can be angled down away from the curved portion.

A service head for use on an electrical service riser that connects a plurality of cables to a power source can include an entry portion for receiving an end of the lower portion of each of the cables and an exit portion through which the upper portion of each of the cables extends. A lug box in the service head is used for electrically connecting the upper portion of each of the cables to the lower portion of each of the cables.

A service center for use in an electrical service riser having a plurality of cables for outputting power to a load can include a housing defining an opening for receiving the cables and a cable reservoir for housing a portion of the cables. A meter fitting/disconnect is located adjacent the housing for receiving the cables and includes a first means for using the riser with an overhead power line, a second means for using the riser with an underground subfeed and means for outputting power to the load. The meter fitting/disconnect also can include a third means for using the riser with an overhead subfeed and a fourth means for using the riser with an underground power line.

DETAILED DESCRIPTION OF THE PREFERRED EMBODIMENTS

Figure 1:
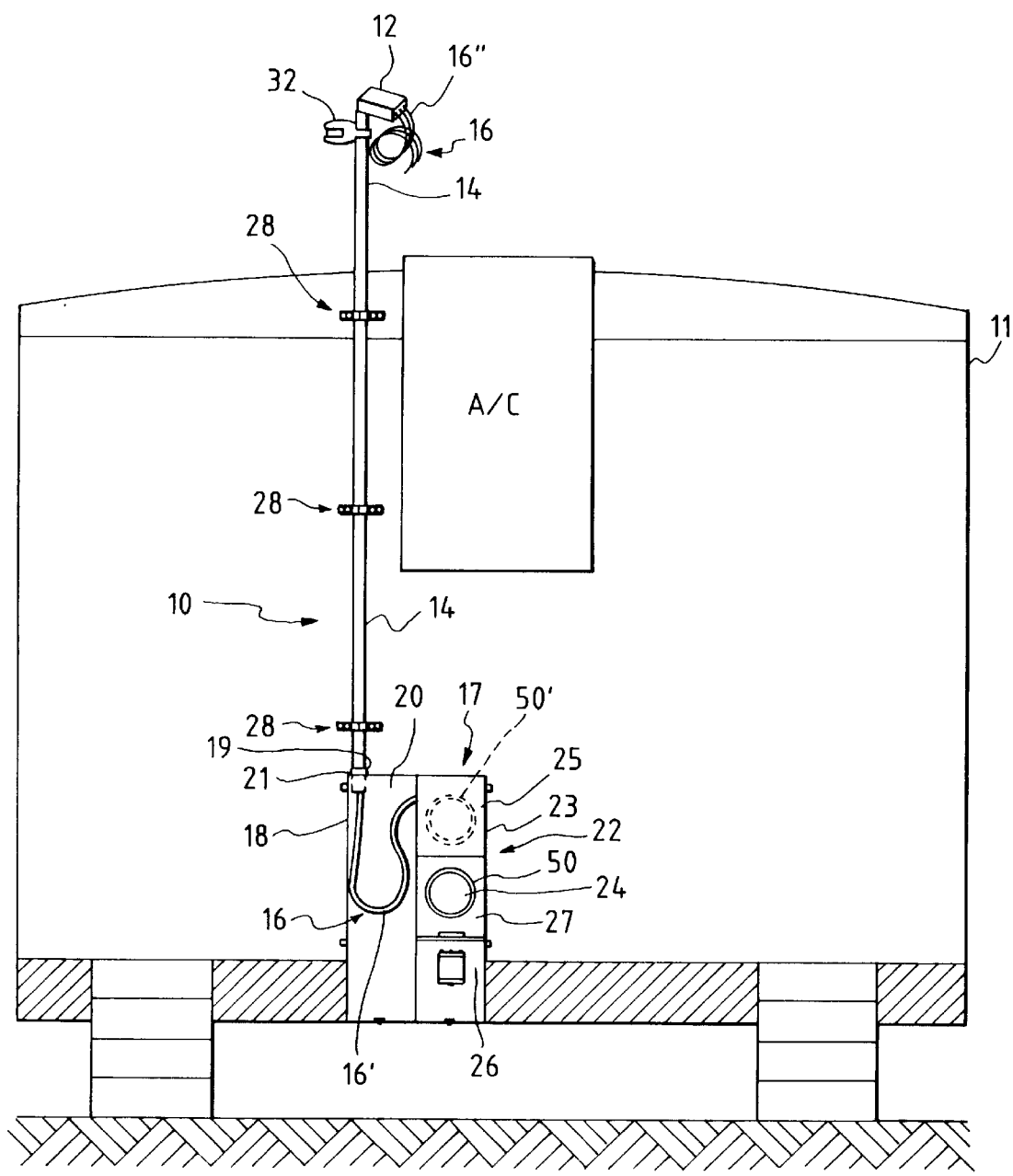
FIG. 1 is a perspective view of a modular electrical service riser in a raised operating position in accordance with the present invention.

Referring first to FIG. 1, there is shown a modular electrical service riser 10 in accordance with the present invention. Riser 10 is shown mounted on a structure, such as an exterior wall of a portable trailer 11, which can transport riser 10 from one location to another. Riser 10 generally includes a service head 12, an elongated conduit 14, cables 16, and a service center 17.

Service head 12 is located at one end of elongated conduit 14. Service head 12 is a tri-lug head with a rain tight NEMA 3-R cover (a rain tight cover as designated by the National Electrical Manufacturers Association Code). Service head 12 preferably includes a lug box (not shown) therein. Each cable 16 preferably is made from a lower portion 16' and an upper portion 16" connected through the lug box. Lower portion 16' of each cable 16 extends throughout the length of conduit 14. Lower portion 16' of each cable 16 is received in an entry portion of service head 12 and is inserted into one end of the lug box. Upper portion 16" of each cable 16 is electrically connected to lower portion 16' of each cable 16 through the lug box. Upper portions 16" of cables 16 extend through an exit portion of service head 12 and are cut by the electric utility company's worker and attached to the overhead power line, when applicable. Service head 12 reduces the problems associated with the worker's cutting cables 16 too close to service head 12. If this occurs, the worker merely has to replace upper portions 16" of cables 16, which extend only into the lug box of service head 12. In conventional systems, the cables that extend out from the service head for connection to the power lines run the length of the conduit, thereby making such replacement more difficult and burdensome.

Conduit 14 houses cables 16 and preferably is made from standard IMC (intermediate heavy wall conduit). Conduit 14 is maintained in place during transport by supports 28. Supports 28 also guide conduit 14 during extension and retraction. Supports 28 are preferably 2" oversized slip conduit supports and preferably are located at three feet intervals on the structural reinforced air conditioner unit wall of trailer 11.

Figure 3:
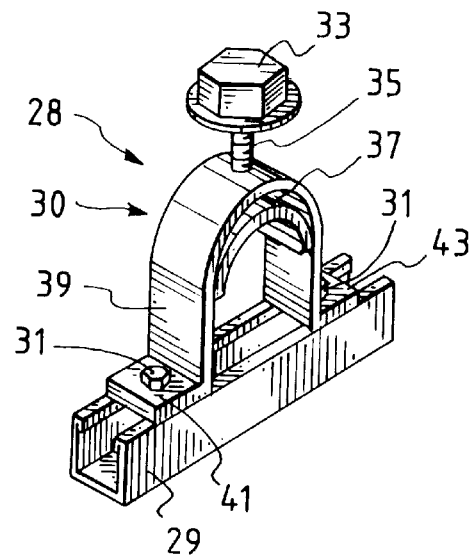
FIG. 3 is a perspective view of a conduit support used with the riser of FIG. 1.

One embodiment of a support 28 is shown in detail in FIG. 3. Support 28 includes a base 29 having a strap 30 attached thereto via bolts 31 or other suitable means. Strap 30 includes a central curved portion 39 and two flat end portions 41 and 43. Support 28 can further include a plastic or steel hexagonal-head, twist knob 33 mounted on a ⅜" threaded clamp 35. Twist knob 33 advantageously is hand operated and therefore supports 28 can be releasably tightened and loosened by a worker in the field without any tools. Alternatively, support 28 can use a means that requires a tool for tightening and loosening support 28. Support 28 optionally includes a saddle 37 disposed between curved portion 39 and conduit 14 (not shown in FIG. 3).

Although twist knob 33 is disposed on central curved portion 39 in FIG. 3, twist knob 33 alternatively can be located on end portion 41 or end portion 43 in lieu of one of bolts 31. In order to allow for the deflection of trailer 11 over time, if twist knob 33 is located on e.g., end portion 43, support 28 preferably is made such that curved portion 39 is shorter (i.e., further from base 29 before attachment) on the side adjacent end portion 43. In this embodiment, end portion 41 can be angled down away from curved portion 39—i.e., prior to attachment, the edge of end portion 41 opposite curved portion 39 is lower than the edge of end portion 41 adjacent curved portion 39 when support 28 is oriented as in FIG. 3. Saddle 37 can be omitted when twist knob 33 is located on end portion 41 or end portion 43.

Returning to FIGS. 1 and 2, a pipe-mounted service drop support (or fork bolt) 32 is located on conduit 14 just below service head 12. Support 32 includes an eyelet for receiving an overhead connection to the utility company's power line. Support 32 preferably is positioned on conduit 14 such that when conduit 14 is retracted to the position of FIG. 2, support 32 abuts the top support 28 to prevent further downward movement of conduit 14. In the retracted position, service head 12 preferably is positioned just below the top of trailer 11 and the lowermost portion of conduit 14 is positioned high enough that it does not contact lower portions 16' of cables 16.

Service center 17 includes a housing 18 and a second housing 23. The top and bottom of service center 17 are removable so that they can be replaced, if necessary. Housing 18 defines a utility cable reservoir 20 for housing part of each cable 16. Housing 18 is shown open for convenience, but in actual use would be covered by a plate that is lockable with utility company seals. Housing 18 defines an opening 21 for telescopically receiving elongated conduit 14. A slip type expansion fitting 19 is disposed about conduit 14 to prevent conduit 14 from falling into opening 21 when conduit 14 is in its raised operating position.

Expansion fitting 19 is preferably annular and is releasably attached to conduit 14 by three set screws. Expansion fitting 19 has an end cap on top. A copper jacketed packing grounding ring is provided next in expansion fitting 19. A waterproof rope packing gland is provided below the copper jacketed packing grounding ring. A metal washer is provided below the waterproof rope packing gland for packing the other elements. A 3" threaded nipple is located below the washer and above a sealing lock nut. The sealing lock nut is located above the top of service center 17. Another lock nut is positioned just below the top of service center 17. A metal bushing is located below the lock nut. Finally, an insulating grounding bushing with a ground wire to an equipment lug is provided below the metal bushing.

Second housing 23 is located adjacent housing 18. Second housing 23 alternatively can be located in front of housing 18 or at some other convenient location depending upon the application. Second housing 23 holds a meter fitting/disconnect 22. Meter fitting/disconnect 22 includes a meter fitting for receiving a meter 24 to measure power consumption and a disconnect 26 for switching off the electrical power.

Service center 17 also includes a reversible metal cover 27. Meter 24 extends through a hole 50 in reversible cover 27. Cover 27 extends from just above disconnect 26, which can be locked with a pad lock, up to the top of service center 17. A rain tight NEMA 3-R hinged cover 25 covers the top of second housing 23 and extends down over a portion of cover 27. When the top half customer subfeed is the power source, no meter is required. Therefore, a bypass is used to create the necessary electrical contact in the absence of the meter. Cover 27 is rotated 180° from the position shown in FIGS. 1 and 2. In this rotated position, the hole is positioned at 50' behind hinged cover 25 as shown in phantom in FIGS. 1 and 2. In this rotated position, the solid half of cover 27 covers the hole where the meter would have been.

Meter fitting/disconnect 22 is a novel apparatus that permits riser 10 to be modular in that riser 10 can be used with either overhead or underground lines and can be used with either the utility company's power lines or a customer's subfeed. Meter fitting/disconnect 22 can be a universal 200 amp. 120/240V and/or 110/208V meter/disconnect with meter bypass and a branch feeder alternate feed with bottom or top feed wireway. The meter has an isolation bypass switch for riser cables 16 when the overhead subfeed option is chosen. The meter bypass switch is an industry standard meter bypass switch that is typically used when a utility company worker is installing or removing a meter. The meter bypass switch serves an additional function in the present invention, as described below.

Figure 4:
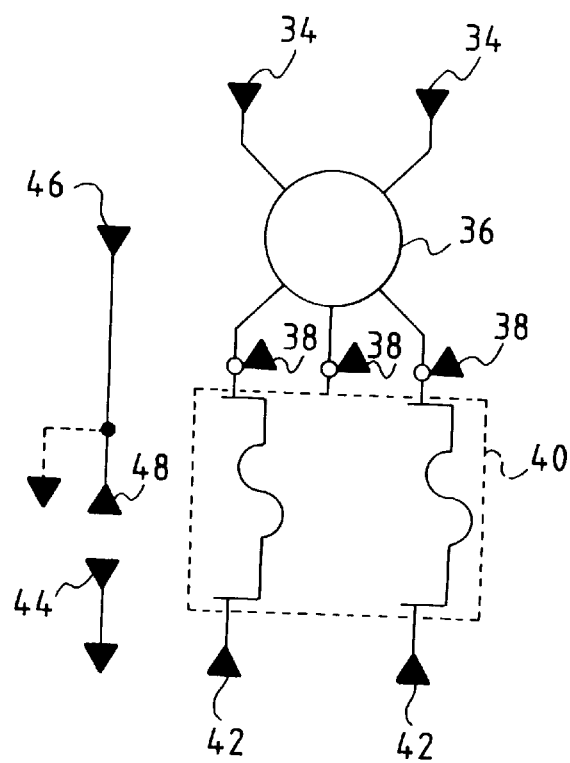
FIG. 4 is a schematic wiring diagram of a meter fitting/disconnect in accordance with the present invention.

FIG. 4 is a schematic wiring diagram for meter fitting/disconnect 22. Meter fitting/disconnect 22 includes line lugs 34 connected to a meter socket 36 which has a manual isolation bypass switch. Underground subfeed line lugs 38 also are connected to meter socket 36. Cables 16 are attached to line lugs 34 (or underground subfeed line lugs 38 as appropriate) with tie wraps or spiral wraps. Meter fitting/disconnect 22 includes a circuit breaker 40, which can be a 60, 100, 125, 150, 200 or 225 amp. max. circuit breaker. Load lugs 42 are provided for connection to a load. Meter fitting/disconnect 22 further includes an equipment ground lug 44 for external grounding and a neutral lug 46. Neutral lug 46 is grounded to second housing 23 by a Z-bracket (not shown) when the power source is a power line from the utility company. The Z-bracket can be swung away so that it does not contact second housing 23 when the power source is a customer subfeed which already has been grounded. In this case, lug 48 is a nongrounded, neutral lug.

Meter fitting/disconnect 22 can be used in any of four possible power source situations: (1) an overhead power line from the utility company; (2) an overhead customer subfeed; (3) an underground power line from the utility company; or (4) an underground customer subfeed.

When used with an overhead power line from the utility company, cables 16 are connected to line lugs 34 and neutral lug 46 is grounded by using the Z-bracket to connect neutral lug 46 to the case. A meter is inserted into meter socket 36. The utility company requires an untamperable service entrance locked by the utility company under these circumstances. The utility company also requires that the meter bypass switch be rendered inoperative. This can be accomplished with a meter bypass preventer (not shown), which can be a metal flange that is mounted on the inside of reversible metal cover 27 and prevents the bypass from being used when the cover is installed.

When an overhead customer subfeed is used, cables 16 are connected to line lugs 34 and lug 48 is a nongrounded, neutral lug. The meter bypass switch is used to make the necessary electrical contact in lieu of the meter. Reversible metal cover 27 is used to cover the hole where the meter would have been. The Z-bracket is positioned so that it does not contact second housing 23.

When an underground utility company power line is used, the utility company's cables are brought up through the bottom of housing 18. Cables 16 are withdrawn from second housing 23 and, e.g., taped to housing 18. The cables brought up through housing 18 are inserted into housing 23 and connected to line lugs 34 and neutral lug 46 which is grounded to the case with the Z-bracket. A meter is inserted into meter socket 36. The Z-bracket is positioned to ground neutral lug 46 to second housing 23.

Finally, when an underground customer subfeed is used, the subfeed cables enter through the bottom of service center 17 and are connected to underground subfeed line lugs 38 and the meter bypass switch is opened to prevent power from flowing up to cables 16. Reversible metal cover 27 is used to cover the hole where the meter would have been.

Returning to FIG. 1, expansion fitting 19 and supports 28 are used to prevent conduit 14 from falling through opening 21 in housing 18 when conduit 14 is in its raised operating position. The combination of conduit 14 and expansion fitting 19 is longer (in at least one dimension) than opening 21.

Figure 2:
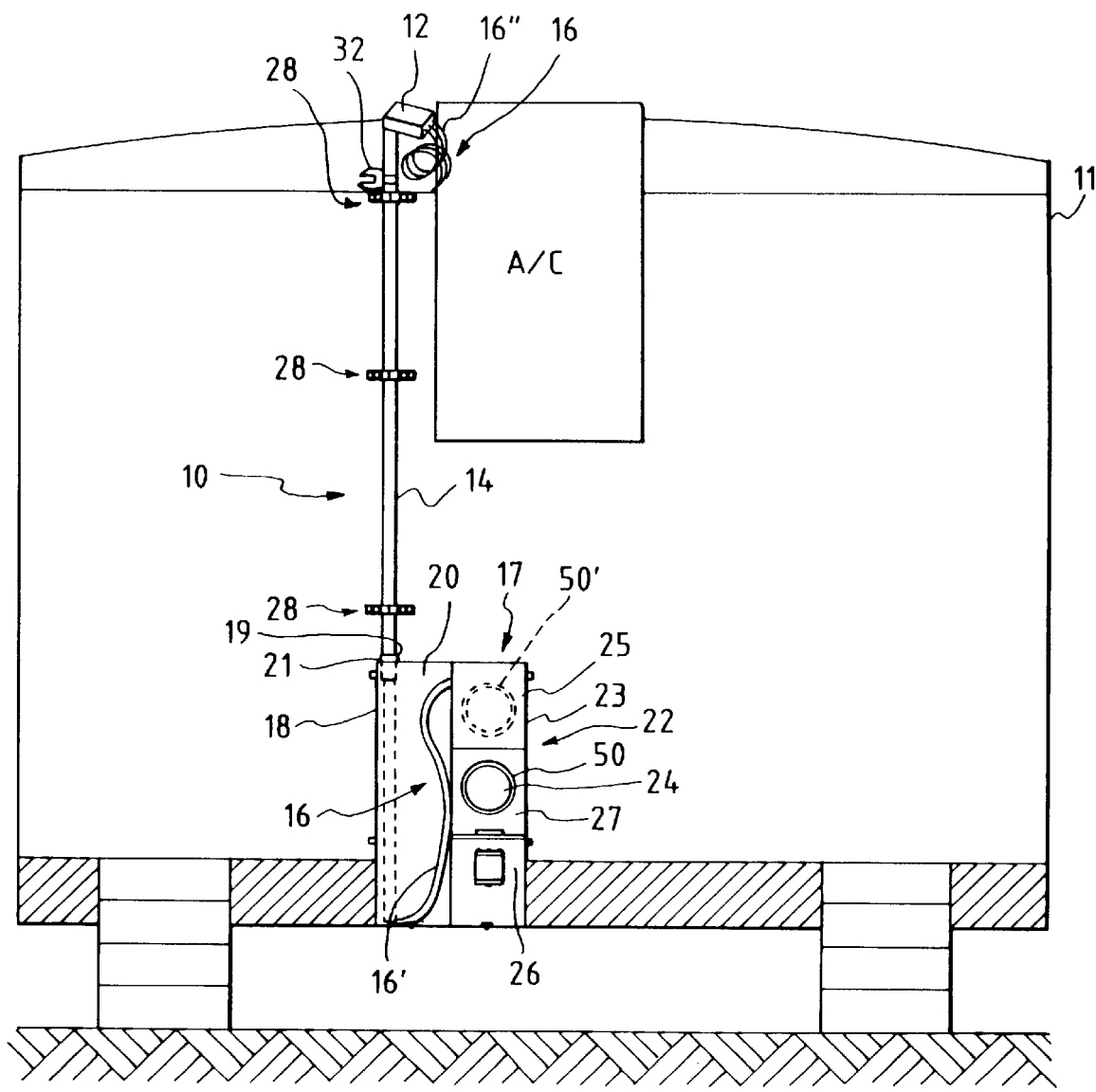
FIG. 2 is a perspective view of the riser of FIG. 1 in a transport position.

When a job that required temporary electrical service has been completed, trailer 11 with its portable modular electrical service riser 10 can be moved to a new location for further use. Prior to transporting riser 10 to the new location, riser 10 is retracted from its raised operating position as shown in FIG. 1 into its transport position as shown in FIG. 2.

Expansion fitting 19 and supports 28 are loosened so that conduit 14 can be retracted through opening 21 in housing 18. Conduit 14 preferably is lowered and limited in its travel until pipe-mounted service drop support 32 abuts the top support 28. Conduit 14 is lowered so that preferably service head 12 is just under the top of trailer 11. Expansion fitting 19 and supports 28 can then be retightened. Riser 10 is now in the position of FIG. 2. In this transport position, trailer 11 is moved to a new location where temporary electrical service is desired. At the new location, expansion fitting 19 and supports 28 are loosened so that conduit 14 can be manually extended to its raised operating position. Once conduit 14 is raised, expansion fitting 19 and supports 28 are tightened to maintain conduit 14 in its raised operating position. In this way, the hardware of riser 10 can be reused and all that is required is a new connection by the utility company's worker to the overhead or underground power line or a new connection to a customer's subfeed. All supports and fittings are the captured type so that no parts are lost in transit.

A modular copper or aluminum bus way having cable connections at each end and cables to be connected at each end of the bus way can be used instead of conduit 14 and cables 16. The first set of cables are used for connecting to the power source. The second set of cables are electrically connected to the first set of cables by the bus way and are received by the meter fitting/disconnect. The bus way is substantially linear and can be retracted for transport and extended into a raised operating position.

Also, conduit 14 can be replaced by a pair of conduits of different diameters. The smaller conduit can be housed within the larger conduit and can be a wireway for the riser. The smaller conduit is telescopically raised out from, and retracted into, the larger conduit.

Thus, a modular electrical service riser has been described that can be transported from one location to another and its parts reused. The riser is modular in that it can be used with either an overhead or underground power line or an overhead or underground subfeeder. Finally, the riser does not require the cables to be bent in the conduit.

Whereas the present invention has been described with respect to specific embodiments thereof, it will be understood that various changes and modifications will be suggested to one skilled in the art and it is intended that the invention encompass such changes and modifications as fall within the scope of the appended claims. For example, the trailer subframe steel support could be used as a cable wireway for the extension or the feeder from this unit.

What is claimed is:

1. A modular electrical service riser for attachment to a structure to provide an interchangeable connection to metered and unmetered power sources, comprising:

a plurality of conductive cables;

an elongated conduit for housing said cables, said conduit movable between an operating position and a transport position and substantially linear when in its operating position;

a service head at one end of said elongated conduit for connecting said cables to the power source;

a housing;

a meter fitting/disconnect for receiving said cables;

a meter socket disposed in said housing, said meter socket dimensioned to receive a meter;

a bypass switch movable between a first position for allowing power to bypass the meter socket and a second position for preventing power from bypassing the meter socket when a meter is in the meter socket;

a cover for closing said housing, wherein said cover defines an opening dimensioned to snugly surround the meter and is movable between a first position wherein said opening is aligned with said meter socket and a second position wherein said cover blocks access to said meter socket; and means for maintaining said bypass switch in said second position when a meter is in said meter socket and said cover closes said housing;

wherein said riser can be interchangeably connected to a metered overhead or underground power line or an unmetered overhead or underground subfeed.

2. The riser of claim 1 wherein said meter fitting/disconnect includes a first means for using the riser with an overhead power lines, a second means for using the riser with an underground subfeed, a third means for using the riser with an overhead subfeed and a fourth means for using the riser with an underground power line.

3. The riser of claim 1 wherein each of said cables includes an upper portion and a lower portion and wherein said service head includes a lug box for electrically connecting said upper portions of said cables to said lower portions of said cables.

4. A modular electrical service riser for attachment to a structure to provide an interchangeable connection to metered and unmetered power sources, comprising:

a plurality of conductive cables;

an elongated conduit for housing part of the length of said cables, wherein said elongated conduit is movable between a raised operating position and a retracted transport position;

a service head at one end of said elongated conduit for connecting said cables to the power source;

a first housing defining a cable reservoir for housing a portion of said conductive cables, said housing also defining an opening for telescopically receiving said elongated conduit;

a meter fitting/disconnect adjacent said first housing for receiving said cables;

a second housing adjacent said first housing;

a meter socket disposed in said second housing;

a two-position bypass switch for routing power to or causing power to bypass the meter socket;

means for preventing power from bypassing the meter socket when a meter is in the meter socket;

wherein said riser can be interchangeably connected to a metered overhead or underground power line or an unmetered overhead or underground subfeed.

5. The riser of claim 4 wherein said elongated conduit is substantially linear in the raised operating position.

6. The riser of claim 5 wherein said elongated conduit is substantially linear in the retracted transport position.

7. The riser of claim 4 wherein said meter fitting/disconnect includes a first means for using the riser with an overhead power lines, a second means for using the riser with an underground subfeed, a third means for using the riser with an overhead subfeed and a fourth means for using the riser with an underground power line.

8. The riser of claim 4 further comprising means for preventing movement of said elongated conduit into said cable reservoir.

9. The riser of claim 8 wherein said preventing means comprises an expansion fitting, said expansion fitting being disposed about said elongated conduit and said conduit and said expansion fitting together being larger in at least one dimension than the opening in said housing.

10. The riser of claim 4 wherein each of said cables includes an upper portion and a lower portion and wherein said service head includes a lug box for electrically connecting said upper portions of said cables to said lower portions of said cables.

11. A modular electrical service riser for attachment to a structure to provide an interchangeable connection to metered and unmetered power sources, comprising:

a first plurality of cables for connecting to the power source;

a second plurality of cables spaced apart from said first plurality of cables;

means for electrically connecting said first plurality of cables to a first end of each of said second plurality of cables; and a housing;

a meter fitting/disconnect for receiving a second end of each of said second plurality of cables;

a meter socket disposed in said housing, said meter socket dimensioned to receive a meter;

means for causing power to bypass the meter socket when no meter is present and for preventing power from bypassing the meter socket when a meter is in the meter socket;

a cover for closing said housing, wherein said cover defines an opening dimensioned to snugly surround the meter and is movable between a first position wherein said opening is aligned with said meter socket and a second position wherein said cover blocks access to said meter socket; and means for maintaining said bypass switch in said second position when a meter is in said meter socket and said cover closes said housing;

wherein said riser can be interchangeably connected to a metered overhead or underground power line or an unmetered overhead or underground subfeed and further wherein said connecting means is movable between an operating position and a transport position, said connecting means being substantially linear when said connecting means is in its operating position.

12. The riser of claim 11 wherein said connecting means comprises a service head.

13. The riser of claim 11 wherein said connecting means comprises a bus way.

14. The riser of claim 5 wherein said plurality of conductive cables comprises a first plurality of cables for connecting to the power source, and a second plurality of cables spaced apart from said first plurality of cables, said riser further comprising means for electrically connecting said first plurality of cables to said second plurality of cables.

15. The riser of claim 14 wherein said connecting means comprises said elongated conduit and said service head.

16. The riser of claim 14 wherein said connecting means comprises a bus way.

17. The riser of claim 14 wherein said service head comprises:

an entry portion;

an exit portion; and a lug box for electrically connecting said first and second plurality of cables.

18. An apparatus, comprising:

a housing;

a meter socket housed in said housing, said meter socket dimensioned to receive a meter;

a bypass switch housed in said housing and movable between a first position for allowing power to bypass the meter socket and a second position for preventing power from bypassing the meter socket; and a cover for closing said housing, said cover defining an opening dimensioned to snugly surround the meter;

wherein said cover is movable between a first position wherein said opening is aligned with said meter socket and a second position wherein said cover blocks access to said meter socket.

19. The apparatus of claim 18 wherein said cover is lockable.

20. The apparatus of claim 18 further comprising means for maintaining said bypass switch in said second position when a meter is in said meter socket and said cover closes said housing.

21. The apparatus of claim 18 further wherein, when said bypass switch is in said first position and no meter is in said meter socket, said cover closes said housing.

22. An apparatus, comprising:

a housing;

a meter socket housed in said housing for receiving a meter;

a bypass switch housed in said housing and movable between a first position for allowing power to bypass the meter socket and a second position for preventing power from bypassing the meter socket; and a cover for closing said housing;

wherein, when said bypass switch is in said first position and no meter is in said meter socket, said cover closes said housing.

* * * * *